United States Patent [19]

Van Paesschen et al.

[11] 3,891,444

[45] June 24, 1975

[54] MOTION PICTURE FILM MATERIALS CONTAINING MAGNETIC RECORDING STRIPES

[75] Inventors: August Jean Van Paesschen, Antwerp; Joseph Antoine Herbots, Edegem, both of Belgium

[73] Assignee: Agfa-Gavaert Aktiengesellschaft, Mortsel, Belgium

[22] Filed: June 3, 1974

[21] Appl. No.: 475,934

[30] Foreign Application Priority Data

June 4, 1973 United Kingdom ............... 26581/73

[52] U.S. Cl. .......................... 96/84 R; 96/39; 96/79; 96/87 R

[51] Int. Cl. ....... G03c 1/84; G03c 1/72; G03c 1/78; G03c 5/14

[58] Field of Search ............... 96/84 R, 87 R, 79, 39

[56] References Cited

UNITED STATES PATENTS

| | | | |
|---|---|---|---|
| 3,418,126 | 12/1968 | Ariga et al. | 96/79 |
| 3,704,167 | 11/1972 | Yamamoto et al. | 96/84 R |
| 3,713,887 | 1/1973 | Stimson | 96/84 R |
| 3,729,317 | 4/1973 | Stimson | 96/84 R |
| 3,808,136 | 4/1974 | Stimson | 96/84 R |
| 3,840,374 | 10/1974 | Van Paesscher et al | 96/84 R |

*Primary Examiner*—Norman G. Torchin
*Assistant Examiner*—J. P. Brammer
*Attorney, Agent, or Firm*—William J. Daniel

[57] ABSTRACT

The adherence is enhanced of magnetic recording stripes to the surface of an antihalation layer of a multilayer motion picture film material comprising a support, at least one light-sensitive emulsion layer on one side of said support and at the opposite side of said support an antihalation layer comprising an alkali-soluble binder, capable of being detached from said support in the presence of an alkaline medium. The coating composition for the magnetic recording stripes comprises magnetizable material dispersed in an alkali-insoluble binder in admixture with a carbodiimide as cross-linking agent for the alkali-soluble binder of the antihalation layer.

6 Claims, No Drawings

MOTION PICTURE FILM MATERIALS CONTAINING MAGNETIC RECORDING STRIPES

The invention relates to motion picture film materials containing magnetic recording stripes and more particularly to a process for the application of a magnetic sound stripe to a motion picture film material.

Magnetic recording stripes are applied preferably to the rear side of the motion picture film support, the front side of the support being provided with a light-sensitive emulsion layer or layers. In general the rear side is provided with a backing layer that is removable and contains an alkali-soluble resin and a dye or pigment, which is most commonly carbon black, intended to provide antihalation protection and to shield the film from light when placed in the camera or removed in daylight. The backing layer is designed in such a way that it can be removed in alkaline solutions or in an alkaline solution followed by a water rinse.

In such a film it is obviously impractical to merely apply the magnetic recording stripe to the removable backing layer, since such layer will loosen partially or wholly from the support in the presence of an alkaline solution such as a developer, so that the magnetic recording stripe will be destroyed or damaged.

In our co-pending application Ser. No. 220,487 filed Jan. 24, 1972 and now U.S. Pat. No. 3,840,374 a process is provided for the application of magnetic recording stripes to a multilayer motion picture film material composed of a support, at least one light-sensitive emulsion layer, and at the opposite side of said support an antihalation layer capable of being detached from said support in the presence of an alkaline solution. The process comprises the application to the antihalation layer of stripes from a coating composition containing magnetisable material dispersed in an alkali-insoluble binder and in admixture therewith a cross-linking agent for the alkali-soluble binder of said antihalation layer.

The antihalation layer applied to the rear side of the motion picture film material comprises a dye or pigment, usually carbon black. The binder may be a cellulose derivative comprising free carboxyl groups, e.g. cellulose acetate phthalate, having a degree of acetyl substitution between 1.0 and 1.7 and a degree of phthalyl substitution between 0.6 and 1.2, a polymeric material comprising a sufficient amount of units carrying free acidic groups, e.g. a copolymer of styrene and maleic or (meth)acrylic acid, a copolymer of vinyl acetate and crotonic acid or (meth)acrylic acid, copolymers of alkyl (meth) acrylate and (meth)acrylic acid, or other polymeric material that is soluble or at least removable in an aqueous alkaline solution.

It is obvious that the cross-linking agent present in the sound stripe is to be adapted each time to the binder of the antihalation layer.

Normally not only a sound stripe is applied to the antihalation layer but also a narrow balance stripe to the edge of the film opposite to that of the sound stripe, the balance stripe having the same composition, in order to facilitate rolling up of the motion picture film. Of course, the data given about the composition of the sound stripe also apply to the composition of the balance stripe.

According to the prior process of U.S. Pat. No. 3,840,374, all bis- or polyfunctional compounds that can enter into reaction with the free acid groups of the binder for the antihalation layer and thus accomplish cross-linking of the antihalation layer, can be added as cross-linking agents to the composition of the sound stripe. Such bis- or polyfunctional compounds comprise at least two reactive groups such as:

- aziridine groups
- epoxide groups
- aldehyde groups
- acryloyl methacryloyl groups
- groups containing reactive halogen atoms, e.g. $—CH_2Cl$ and sulphofluoride groups, and
- soluble metal complexes.

It has now been found that very interesting results can be obtained when carbodiimides are added as cross-linking agents to the composition of the magnetic recording stripe and the balance stripe.

According to the invention a process is provided for the application of magnetic recording stripes to a multilayer motion picture film material composed of a support, at least one light-sensitive emulsion layer, and at the opposite side of said support an antihalation layer capable of being detached from said support in the presence of an alkaline solution and applied to said antihalation layer stripes of a coating composition containing magnetizable material dispersed in an alkali-insoluble binder in admixture with a cross-linking agent for the alkali-soluble binder of said antihalation layer, characterized in that said cross-linking agent is a carbodiimide.

Suitable carbodiimides are e.g.:

- N-methyl-N'-propyl-carbodiimide
- N-ethyl-N'-propyl-carbodiimide
- N,N'-diisopropyl-carbodiimide
- N,N'-di-n-butyl-carbodiimide
- N,N'-di-allyl-carbodiimide
- N,N'-di-cyclohexyl-carbodiimide
- N-(3-dimethylaminopropyl)-N'-ethyl-carbodiimide hydrochloride
- N,N'-di(p-dimethylaminophenyl)-carbodiimide
- N,N'-di(p-diethylaminophenyl)-carbodiimide
- N,N'-di(triphenylmethyl)-carbodiimide
- N,N'-di-p-tolyl-carbodiimide Film-forming polymeric compounds that are insoluble in alkaline solutions can be used as binders for magnetizable material. Appropriate compounds of this type are cellulose esters and ethers, polymerisation products such as polyvinyl chloride and polyvinyl esters, polyacryl compounds that are insoluble in alkali, polycondensation products such as alkyd resins, polyamides, polyesters, polyurethanes, etc. Mixtures of such binders can be used too, of course. Plasticizers for the binder, lubricating agents, and wetting agents can be added also to the coating solution of the magnetic recording stripe.

Very interesting coating compositions forming magnetic recording stripes are described in the United Kingdom Patent Specifications Nos. 986,473; 991,675; 1,058,424; 1,080,614; 1,152,651 and 1,153,316.

Suitable supports for motion picture film are films made of film-forming polymers such as cellulose esters, e.g. cellulose triacetate, polycarbonates based on bis-hydroxyphenylalkanes, or polyesters preferably polyethylene terephthalate.

The process of the invention could be modified also in that a thin intermediate layer is applied to the very places whereon the sound stripe and the balance stripe are to be coated, the intermediate layer then comprising a compound, which by reaction with the acid groups of the alkali-soluble binder for the antihalation layer would make the carbon black antihalation layer insoluble in the alkaline processing baths. However, this is not easy at all and moreover, it would require an additional step in the manufacture of the motion picture film material. So, preference is given to the incorporation of the cross-linking agent for the alkali-soluble binder of the antihalation layer into the sound stripe itself, so that right under the sound stripe the antihalation layer becomes insoluble in alkaline baths.

The following examples illustrate the invention.

EXAMPLE 1

A cellulose triacetate film was covered on one side with a known subbing layer and one or more light-sensitive emulsion layers for colour photography. An anticurling layer was applied to the other side from the following composition:

| | |
|---|---|
| cellulose acetate (D.S. acetyl 2.5) as a 5 % solution in acetone | 100 ml |
| acetone | 750 ml |
| methanol | 75 ml. |
| n-butanol | 75 ml |

This layer was applied at a ratio of 38 sq.m/litre.

After drying an antihalation layer was applied thereto at a ratio of 25 sq.m/litre from the composition:

| | |
|---|---|
| cellulose acetate phthalate | 30 g |
| colloidal carbon black having a particle size of about 50 nm | 8 g |
| ethylene glycol monomethyl ether | 250 ml |
| acetone | 250 ml |
| ethanol | 500 ml |

The cellulose acetate phthalate used as a binder in the above antihalation layer should be soluble in alkaline sodium. Therefore, a cellulose acetate phthalate having a degree of acetyl substitution (D.S. acetyl) of 1.30 and a degree of phthalyl substitution (D.S. phthalyl) of 0.82 is used.

Sound and balance stripes were applied to the dried antihalation layer from the following coating composition:

| | |
|---|---|
| magnetic iron oxide | 210 g |
| cellulose nitrate | 60 g |
| dioctyl phthalate | 30 ml |
| acetone | 100 ml |
| methyl ethyl ketone | 850 ml |
| dimethylformamide | 50 ml |
| N,N'-di-cyclohexyl-carbodiimide | 15 g. |

Both stripes were coated in such a way that upon drying a thickness of about 13 μm was obtained.

The adhesion of the sound and balance stripes to the antihalation layer before processing was excellent. After the photographic colour material had been processed in the usual photographic baths, the black antihalation layer had disappeared but it remained completely intact at the places covered by the sound and balance stripes as could easily be examined under a microscope.

When the N,N'-di-cyclohexyl-carbodiimide was omitted from the above coating composition for the sound and balance stripes, the black antihalation layer, after development in the usual photographic baths, had also disappeared under the edges of the sound and balances stripes. This deficiency leads to the scaling of both stripes when in contact with the recording heads, which are soiled thereby.

EXAMPLE 2

The process of Example 1 was repeated with the sole difference that in the coating composition for the magnetic recording and the balance stripes the 15 g of N,N'-dicyclohexyl-carbodiimide were replaced by 7.5 g of N,N'-diisopropyl-carbodiimide.

The adhesion of the sound and balance stripes was good, before as well as after the processing in the photographic baths, whereby the antihalation layer itself, was eliminated. The antihalation layer remained fully intact under both stripes.

EXAMPLE 3

A biaxially oriented polyethylene terephthalate film of 100 μm, the front side of which has been provided with a known subbing layer and one or more light-sensitive emulsion layers for colour photography, was coated on its rear side with a subbing layer from a copolymer of vinyl chloride, vinylidene chloride, n-butyl acrylate, and itaconic acid (63:30:5:2 percent by weight). The subbing layer was covered with an antihalation layer from the following coating composition:

| | | |
|---|---|---|
| copolymer of vinyl acetate and crotonic acid (7.8 % by weight of crotonic acid) | 23.25 | g |
| polymethylene p-hydroxybenzoic acid | 2.50 | g |
| SETAMOL WS (trade-name) | 1.65 | g |
| colloidal carbon black having a particle size of about 400 A | 10.00 | g |
| GAFAC RM 710 (trade-name) | 0.50 | g |
| SILICONE L 5310 (trade-name) | 0.50 | g |
| water | 190 | ml |
| methanol | 800 | ml |
| 25 % aqueous solution of ammonia | 10 | ml. |

This coating composition was applied to the subbing layer at a ratio of 35 sq.m/litre. The polymethylene p-hydroxybenzoic acid is the resin resulting from the polycondensation of p-hydroxybenzoic acid and formaldehyde.

SETAMOL WS is the trade-name of Badische Anilin- und Soda-fabriken, Germany for a polymethylene dinaphthalene disodium sulphonate corresponding to the formula:

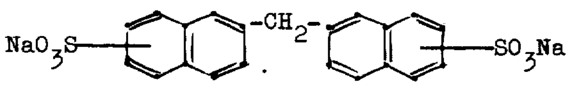

GAFAC RM 710 is the trade-name for a product sold by General Aniline and Film Corp., U.S.A. for a mixture of organic phosphates corresponding to the formulae:

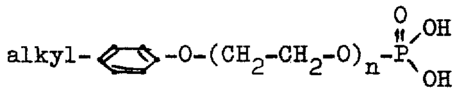

and

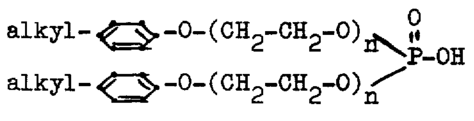

and SILICONE L 5310 is the trade-name of Dow Chemical Co., U.S.A. for a silicone resin consisting of a block copolymer of dimethylsilicone with a polyether.

After the drying of the antihalation layer narrow stripes of sound stripe and balance stripe were applied thereto from the following composition:

| | | |
|---|---|---|
| magnetic iron oxide | 213 | |
| copolymer of vinyl chloride, vinyl acetate and vinyl alcohol (91:3:6 % by weight) | 68 | g |
| GAFAC RM 710 (trade-name) | 4 | g |
| N,N'-di-p-tolyl-carbodiimide | 10 | g |
| n-butyl acetate | 600 | ml |
| ethyl acetate | 400 | ml |

Both stripes were coated in such a way that upon drying a thickness of about 12 μm was obtained.

The adhesion of the sound and balance stripes to the antihalation layer before processing was excellent.

After the usual processing in the photographic baths of the photographic material thus formed, the black antihalation layer was dissolved away, but remained completely intact at the places covered by the sound and balance stripes.

EXAMPLE 4

The process of Example 3 was repeated with the sole difference that the 10 g of N,N'-di-p-tolyl-carbodiimide were replaced by 4 g of N,N'-di-isopropyl-carbodiimide.

The same good results were obtained.

EXAMPLE 5

The process of Example 3 was repeated with the difference that the coating composition for the sound and balance stripes consisted of the following substances:

| | | |
|---|---|---|
| magnetic iron oxide | 210 | g |
| cellulose nitrate | 60 | g |
| dioctyl phthalate | 30 | ml |
| acetone | 100 | ml |
| methyl ethyl ketone | 850 | ml |
| dimethylformamide | 50 | ml |
| N-(3-dimethylaminopropyl)-N'-ethyl-carbodiimide hydrochloride | 7.5 | g |

The same good results were obtained.

EXAMPLE 6

A known subbing layer and one or more light-sensitive emulsion layers for colour photography were applied to one side of a biaxially oriented polyethylene terephthalate film of 85 μm. To the other side a subbing layer was applied from the following composition at a ratio of 80 sq.m/liter:

| | | |
|---|---|---|
| copolymer of vinyl chloride, vinylidene chloride, n-butyl acrylate, and itaconic acid (50:30:18:2 % by weight) | 10 | g |
| dichloroethane | 500 | ml |
| methylene chloride | 497.5 | ml |
| dichloroacetic acid | 2.5 | ml |

The dried subbing layer was coated with an antihalation layer at a ratio of 27 sq.m/litre from the following coating composition:

| | | |
|---|---|---|
| copolymer of ethyl acrylate, methyl methacrylate, and methacrylic acid (19:56:25 % by weight) as a latex of 24 % concentration | 93 | ml |
| colloidal carbon black having a particle size of about 350 A | 7.5 | g |
| SETAMOL WS (trade-name) | 2.5 | g |
| water | 25 | ml |
| methanol | 870 | ml |
| 25 % aqueous solution of ammonia | 2 | ml |

Narrow strips of sound track and balance stripes were coated on the dried antihalation layer from the same coating composition as described in Example 1.

The adhesion of the sound and balance stripes to the antihalation layer before processing was excellent. After processing in the usual photographic baths, the black antihalation layer had completely disappeared, except in the places covered by the sound and balance stripes.

For comparison, the N,N'-di-cyclohexyl-carbodiimide was omitted from the coating composition for the sound and balance stripes. It was found that the antihalation layer had also disappeared after processing under the edges of the sound and balance stripes. This leads to the destruction of both stripes when they pass the recording heads.

We claim:

1. Multilayer motion picture film material comprising a support, at least one light-sensitive emulsion layer at one side of said support, and at the opposite side of said support an antihalation layer comprising an alkali-soluble polymeric binder capable of being detached from said support in the presence of an alkaline medium, and deposited upon said antihalation layer stripes of a coating composition of magnetizable material dispersed in an alkali-insoluble binder in admixture with a carbodiimide as cross-linking agent for the alkali-soluble polymeric binder of said antihalation layer.

2. Multilayer motion picture film material according to claim 1, wherein the alkali-soluble binder for said antihalation layer is cellulose acetate phthalate having a degree of acetyl substitution between 1.0 and 1.7 and a degree of phthalyl substitution between 0.6 and 1.2.

3. Multilayer motion picture film material according to claim 1, wherein the alkali-soluble binder for said antihalation layer is formed of a mixture of a copolymer of vinyl acetate and crotonic acid containing 7.8 percent by weight of crotonic acid and of polymethylene-p-hydroxy-benzoic acid.

4. Multilayer motion picture film material according to claim 1, wherein the alkali-soluble binder for said antihalation layer is a copolymer of ethyl acrylate, methyl methacrylate, and methacrylic acid (19:56:25 percent by weight).

5. Multilayer motion picture film material according to claim 1, wherein the cross-linking agent added to the coating composition of magnetizable material is N,N'-di -isopropylcarbodiimide.

6. Multilayer motion picture film according to claim 1, wherein the cross-linking agent added to the coating composition of magnetisable material is N,N'-dicyclohexylcarbodiimide.

* * * * *

UNITED STATES PATENT OFFICE
CERTIFICATE OF CORRECTION

PATENT NO. : 3,891,444
DATED : June 24, 1975
INVENTOR(S) : August Jean Van Paesschen et al It is certified that error appears in the above-identified patent and that said Letters Patent are hereby corrected as shown below:

In the Heading of the Patent, under "Assignee" change "Agfa-Gavaert Aktiengesellschaft" to -- AGFA-GEVAERT, a Naamloze Vennootschap --.

Signed and Sealed this

*fourth* Day of *November 1975*

[SEAL]

*Attest:*

RUTH C. MASON
*Attesting Officer*

C. MARSHALL DANN
*Commissioner of Patents and Trademarks*